United States Patent
Hacker

[15] 3,703,233
[45] Nov. 21, 1972

[54] VIBRATORY FEEDING APPARATUS

[72] Inventor: Harold R. Hacker, 522 Woodview Drive, Noblesville, Ind. 46060

[22] Filed: Feb. 8, 1971

[21] Appl. No.: 113,578

[52] U.S. Cl. .................................. 198/220 DC
[51] Int. Cl. ................................. B65g 27/24
[58] Field of Search..198/220 CA, 220 DC; 209/368, 209/415

[56] References Cited

UNITED STATES PATENTS

| | | | |
|---|---|---|---|
| 2,334,368 | 11/1943 | Wolf | 209/415 X |
| 3,216,556 | 11/1965 | Burgess | 198/220 CA |
| 2,446,752 | 8/1948 | Fiddyment | 198/220 DC X |
| 1,672,807 | 6/1928 | Etzel | 198/220 DC |

*Primary Examiner*—Edward A. Sroka
*Attorney*—Woodard, Weikart, Emhardt & Naughton

[57] ABSTRACT

An apparatus for feeding items in a given direction through the use of controlled vibratory motion. An open ended chute is mounted above a base in spaced relation. An armature fixed to the chute extends into the base and is vibrated by an electromagnet mounted within the base. The chute is mounted above the base by a first and second stack of leaf springs. The first stack of leaf springs is arranged vertically so as to be perpendicular to the chute. The second stack is arranged obliquely with respect to the first stack of leaf springs. A cover plate is mounted to the base enclosing the electromagnet and a rubber grommet mounted to the base is in sealing relationship with the armature. Rubber feet are mounted beneath and to the base.

6 Claims, 4 Drawing Figures

INVENTOR.
HAROLD R. HACKER
BY
Woodard, Weikart, Emhardt & Naughton
ATTORNEYS

VIBRATORY FEEDING APPARATUS

BACKGROUND OF THE INVENTION

1. Field of the Invention

This invention is in the field of feeding devices.

2. Description of the Prior Art

Vibratory feeders have been the subject matter of quite a number of U.S. Pat. Nos. as indicated, for example, by the following list:

| | |
|---|---|
| Re. 26,291—Carrier, Jr. | 3,380,572—Luger |
| 3,322,260—Schwenzfeier | 3,397,768—Haumiller |
| 3,334,787—Sugimoto et al. | 3,405,821—Slesaczek et al. |
| 3,335,861—Musschoot et al. | 3,410,548—Sieckman et al. |
| 3,342,075—Lowe | 3,412,699—Culp et al. |
| 3,346,095—Dixon | 3,415,417—Steel |
| 3,346,097—Carrier, Jr. | 3,417,882—McConnell |
| 3,347,352—Gwinn, Jr. | 3,429,423—Pirrello et al. |
| 3,348,664—Renner | 3,430,751—Bateson |
| 3,358,815—Musschoot et al. | 3,432,079—Williams |
| 3,360,109—Bryner et al. | 3,435,995—Garnett |
| 3,362,524—Holman | 3,447,660—Winans |
| 3,367,480—Burgess, Jr. | 3,459,292—Piroutek |
| 3,372,793—Redford et al. | 3,472,431—Bodine, Jr. |
| 3,373,618—Miller et al. | 3,473,759—Spiess |

The devices of the prior art are not, however, completely satisfactory and there is room for improvement. The problem with the prior art feeders having an open ended chute is that the flow rate of the items vibrated on the chute tends to vary a great deal from the receiving end of the chute where they normally flow slowly to the discharge or open end of the chute where they tend to flow rapidly and erratically resulting in a highly non-uniform flow rate. The present invention solves this problem by uniformly vibrating the chute and by controlling the vibration of the chute through the use of a first stack of leaf springs obliquely positioned with respect to a second stack of leaf springs, both stacks being used to secure the chute to the base of the apparatus.

The vibrator disclosed by this specification may be utilized to produce vibratory motion in a variety of different sized and configured chutes and bins as contrasted to only a specific type of chute or bin. The present feeder has new and improved means for suspending the chute above an electromagnet for producing a vibratory feeding motion. The present invention relates to a non-impact vibratory motion as opposed to certain vibrators and feeders which use a rubber or metal bumper as a part of their vibration output.

SUMMARY OF THE INVENTION

One embodiment of the present invention is a vibratory feeding apparatus comprising: a base; a chute in a spaced relation to said base and having a first end and a second end; first means for vibrating said chute relative to said base; a first leaf spring having a first proximal end and a first distal end, said proximal end being fastened to said base with said distal end being connected to said chute; a second leaf spring having a second proximal end and a second distal end, said second proximal end being fastened to said base with said second distal end being fastened to said chute nearer said second end than said first spring, said second distal end being located a distance greater from said first spring than said second proximal end and said first spring being positioned nearer said first end than said second spring.

A second embodiment of the present invention is a feeder comprising: a base; a chute in spaced relation to said base; means for vibrating said chute with respect to said base; a first leaf spring having a first end fastened to said base and having a second end fastened to said chute; a second leaf spring having a first end fastened to said base and having a second end fastened to said chute, said second spring being positioned obliquely with respect to said first spring.

It is an object of the present invention to provide a vibratory feeding apparatus for feeding items in a given direction through the use of controlled vibratory motion.

It is a further object of the present invention to provide a feeder for vibrating items in a given direction in such a manner that items move at a highly uniform flow rate over the entire length of the chute.

Related objects and advantages of the present invention will be apparent from the following description.

DESCRIPTION OF THE PREFERRED EMBODIMENT

Figure 1:
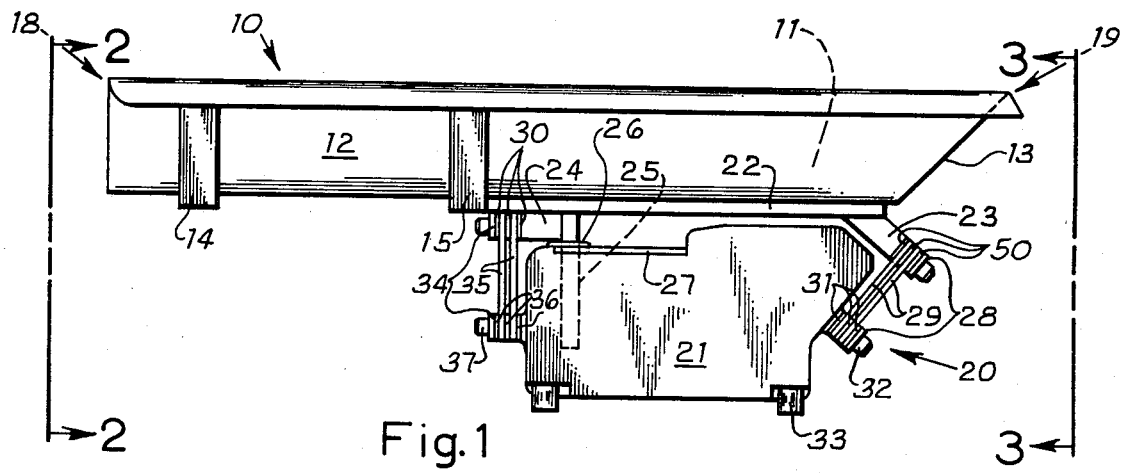
FIG. 1 is a side view of a vibratory feeding apparatus incorporating the present invention.
Figure 2:
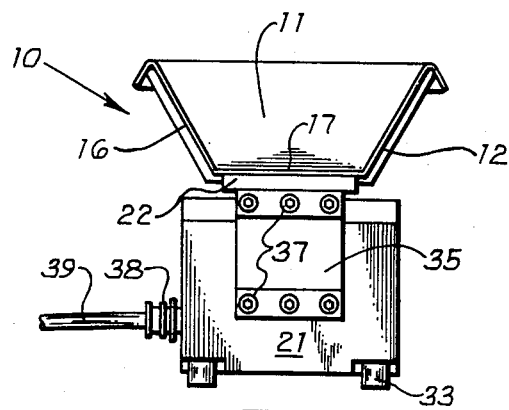
FIG. 2 is an end view of the apparatus of FIG. 1 viewed in the direction of arrows 2—2.
Figure 3:
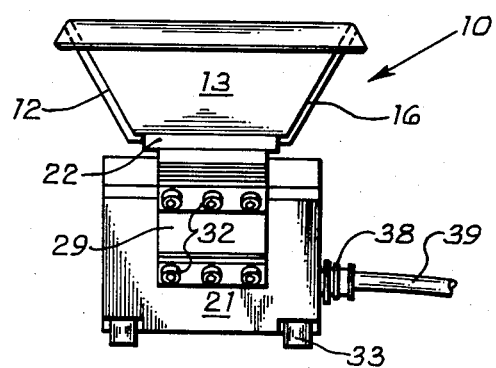
FIG. 3 is the opposite end view of the apparatus of FIG. 1 viewed in the direction of arrows 3—3.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawings, there is shown a vibratory feeding apparatus having a chute 10 mounted in spaced relationship to a base 20. Chute 10 has a pair of converging side walls 12 and 16 integrally joined to a generally horizontal flat bottom wall 17. End 18 of chute 10 is opened whereas end 19 of the chute is closed by wall 13 integrally joined to walls 12, 16 and 17. Ribs 14 and 15 are joined to walls 12 and 16 by welding or other suitable means for supporting the top portion of the walls. The base 20 vibrates chute 20 in such a manner so as to feed or move items deposited into the chute in the direction of arrow 49. The items to be moved in the direction of arrow 49 are dropped through opening 11 into the chute and the chute is then vibrated so as to uniformly move the items toward the open end 18 of the chute.

Figure 4:
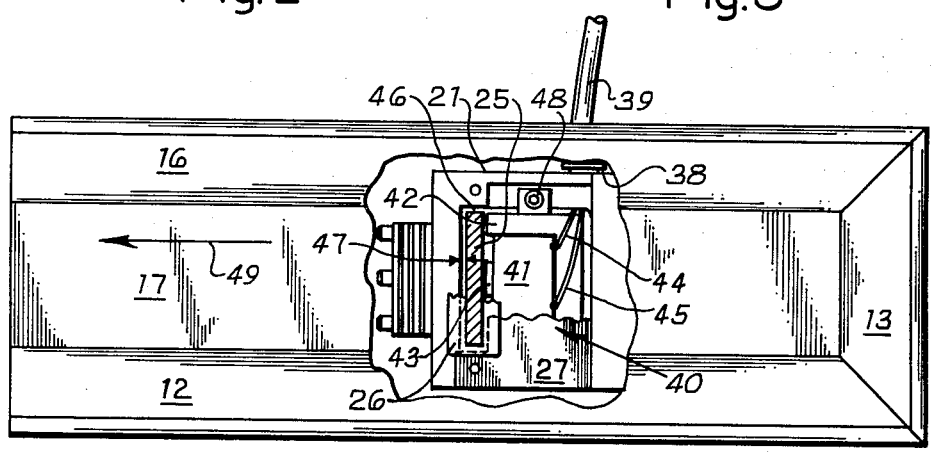
FIG. 4 is a top fragmentary view of the apparatus of FIG. 1 with the chute and cover plate being fragmented to illustrate the interior of the base.

Base 20 has a main body 21 with an electromagnet 40 mounted therein. Main body 21 is heavy being made from a material such as cast iron. Rubber feet 33 are mounted beneath and to body 21 at each of the lower corners of the main body. The chute 10 and cover plate 27 are fragmented in FIG. 4 to illustrate the mounting arrangement of electromagnet 40. The electromagnet has a coil 41 with electrical leads 44 and 45 attached thereto extending out through fitting 38 secured to the side of main body 21. Wires 44 and 45 are routed through cord 39 to a suitable source of electrical energy for electrically charging coil 41 producing a magnetic field in the core of the electromagnet. In one embodiment of the present invention, an E-configured core was utilized. Only a portion of the E-configured core is shown, namely the center bar 43 and one of the end bars 42. Electromagnets are well known in the field and thus this specification will not elaborate in great detail thereon. The electromagnet is secured within cavity 46 of main body 21 by fastening devices 48. The armature 25 of the electromagnet has a top end secured to the chute and extends down into the base being spaced from the electromagnet core. Thus, the magnetic field developed within the electromagnet core will apply force to armature 25 toward and opposite arrow 49. A cover plate 27 is mounted to the main body 21 so as to enclose cavity 46. Cover plate 27 is slotted so as to receive armature 25. The slot in the cover plate is sufficiently large so as to allow for the generally horizontal motion of armature 25. In addition, the armature is spaced a distance 47 from the end of main body 21 so as not to interfere with the main body during the vibratory motion. A flexible rubber grommet 26 extends down into cavity 46 through the slot formed by cover plate 27 as to sealingly and flexibly embrace armature 25 thereby preventing foreign matter from entering cavity 46.

Secured to the bottom of chute 10 by welding or other suitable means is a plate 22. Armature 25 is fixedly secured to plate 22 so as to be perpendicular to the chute and bottom wall 17. A pair of mounting blocks or supports 23 and 24 are secured to plate 22. Plate 24 is also fastened to armature 25 and is parallel with plate 22 extending horizontally beyond the end of main body 21. A first stack of parallel leaf springs 35 has proximal ends secured to body 21 by fasteners 37. The distal ends of leaf springs 35 are secured to block 24 also by fasteners 37. Spacers 36 are positioned on both side of leaf springs 35 so as to space apart the distal ends of the springs. Likewise, spacers 30 are positioned on both sides of the proximal ends of leaf springs 35 so as to space apart the proximal ends. Fasteners 37 have shanks which pass freely through the spacers and leaf springs being threadedly received by clock 34 and main body 21. A pair of bars 34 are positioned adjacent the outermost spacers 30 and 36 for seatingly receiving the bolt heads of fasteners 37.

Support 23 is fastened to plate 22 so as to be positioned obliquely with respect to chute 10 and bottom wall 17. The free end of support 23 perpendicularly receives a stack of leaf springs 29. A pair of leaf springs 29 is shown in the drawing along with a pair of leaf springs 35; however, it is understood that more than or less than two leaf springs may be employed in each stack. Proximal ends of leaf springs 29 are secured to main body 21 whereas the distal ends of leaf springs 29 are secured to support 23. Standard fastening devices 32 are utilized to secure the leaf springs to main body 21 and support 23. Spacers 31 are positioned on either side of the proximal ends of springs 29 so as to space the proximal ends apart. Likewise, spacers 50 are positioned on either side of the distal ends of leaf springs 29 so as to space the distal ends apart. A bar 28 is positioned adjacent the outermost spring 29 providing a seat for receiving the heads of fastening devices 32 which are threaded into main body 21 and support 23.

The chute, armature and leaf springs are positioned in a manner such as to move the items within the chute in the direction of arrow 49. For example chute 10 is positioned above and is in spaced relation to base 20. Leaf springs 29 are fastened to chute 10 beneath end 19 so as to be nearer end 19 than leaf springs 35. The distal ends of leaf springs 29 connected to support 23 are located a distance greater from leaf springs 35 than the distance between the proximal end of leaf springs 29 and leaf springs 35. On the other hand, leaf springs 35 are positioned nearer the open end 18 than leaf springs 29. Chute 10 is generally horizontal whereas leaf springs 35 and armature 25 are generally vertical being perpendicular to chute 10 and wall 17. In addition, leaf springs 29 are positioned perpendicular to support 23 and are positioned obliquely with respect to leaf springs 35 and armature 25 which is perpendicularly and cantileveredly mounted to chute 10. Vertical leaf springs 35 tend to move the chute with the same amount of vertical and horizontal amplitude as do the obliquely mounted leaf springs 29 resulting in an uniform flow rate from end 19 to end 18, the reason for this being a corresponding compensating movement of the proximal ends of the leaf springs.

The leaf springs may be produced from a variety of materials. Excellent results have been obtained by producing the leaf springs from fiber glass or nylon. Chute 10 and armature 25 may be produced from steel. By arranging springs 29 obliquely with respect to springs 35 and chute 10 the items moved in chute 10 will not discharge wildly and erratically from end 18. It will be evident from the above description that the present invention provides a vibratory feeding apparatus for feeding items in a given direction through the use of controlled vibratory motion. It will be further evident from the above description that the present invention provides a feeder for vibrating items in a given direction in such a manner that the items move along and are discharged from the chute at the same flow rate.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A vibratory feeding apparatus comprising:
   a base;
   a chute in spaced relation to said base and having a first end and a second end;
   first means for vibrating said chute relative to said base;
   a first leaf spring having a first proximal end and a first distal end, said first proximal end being fastened to said base and said first distal end being connected to said chute;

a second leaf spring having a second proximal end and a second distal end, said second proximal end being fastened to said base with said second distal end being fastened to said chute nearer said second end than said first spring, said second distal end is located a distance greater from said first spring than said second proximal end, said first spring being positioned nearer said first end than said second spring; and wherein:

said chute is generally horizontal;

said first spring is generally vertical;

said first means is an electromagnet mounted in said base and an armature mounted to said chute in spaced relationship to said electromagnet, said armature is positioned generally vertically and extends into said base; and further comprising:

a sealing flexible grommet mounted to said base in sealing relationship to said armature extending therethrough.

2. The apparatus of claim 2 and further comprising:

a plurality of said first leaf spring arranged in a first vertical stack;

a plurality of said second leaf springs arranged in a second stack;

a first spacer positioned between the first distal ends of said first springs;

a second spacer positioned between the first proximal ends of said first springs;

a third spacer positioned between the second distal ends of said second springs; and a fourth spacer positioned between the second proximal ends of said second springs.

3. A feeder comprising:

a base;

a chute in spaced relationship to said base;

means for vibrating said chute with respect to said base;

a first leaf spring having a first end fastened to said base and having a second end fastened to said chute;

a second leaf spring having a first end fastened to said base and having a second end fastened to said chute, said second spring being positioned obliquely with respect to said first spring;

a plurality of said first springs being parallel with first spaced apart ends and second apart ends;

a plurality of said second springs being parallel with first spaced apart ends and second spaced apart ends;

said means is an electromagnet mounted in said base and an armature cantileveredly mounted to said chute and extending into said base, said armature is perpendicular to said chute and parallel with said first springs, said electromagnet is operable to vibrate said armature in a general horizontal motion;

a flexible grommet mounted to said base in sealing relationship to said armature;

a first plate obliquely fastened to said chute and being perpendicularly fastened to said second ends of said second springs.

4. The feeder of claim 3 wherein:

said chute has a horizontal bottom wall and a pair of converging side walls integrally jointed to said bottom wall;

said chute has an opened first end and a closed second end, said second end being positioned over said second springs and said first end being positioned outwardly of said first springs and located a distance to said first springs less than the distance between said first end and said second springs, and further comprising:

an electromagnet cover plate removably mounted to said base and in contact with a portion of said grommet; and, rubber feet mounted beneath and to said base.

5. A feeder comprising:

a base;

an elongated chute;

means for vibrating said cute with respect to said base, said means having an armature connected to said chute;

a first vertical leaf spring having a first end fastened to said base and having a second end fastened to said chute;

a second leaf spring having a first end fastened to said base and a second end fastened to said chute, said second spring being positioned obliquely with respect to said first spring; and, a flexible grommet mounted to said base in sealing relationship to said armature.

6. The feeder of claim 5 additionally comprising:

a plurality of said first vertical leaf springs with ends spaced apart; and a plurality of said second leaf springs with ends spaced apart.

* * * * *

UNITED STATES PATENT OFFICE
CERTIFICATE OF CORRECTION

Patent No. 3,703,233            Dated November 21, 1972

Inventor(s) Harold R. Hacker

It is certified that error appears in the above-identified patent and that said Letters Patent are hereby corrected as shown below:

Column 4, line 68

Delete "and" and insert --with--

Column 5, line 20

Delete "claim 2" and insert --claim 1--

Column 5, line 21

Delete "spring" and insert --springs--

Column 5, line 46

Delete "second apart ends" and insert --spaced apart ends--

Column 6, line 16

Delete "jointed" and insert --joined--

Column 6, line 32

Delete "cute" and insert --chute--

Signed and sealed this 1st day of May 1973.

(SEAL)
Attest:

EDWARD M. FLETCHER, JR.
Attesting Officer

ROBERT GOTTSCHALK
Commissioner of Patents